United States Patent
Queyquep

[11] Patent Number: 5,907,112
[45] Date of Patent: *May 25, 1999

[54] PROBE SECONDARY SEAL

[75] Inventor: Cesar L. Queyquep, Lisle, Ill.

[73] Assignee: Magnetrol International Inc., Downers Grove, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/955,270

[22] Filed: Oct. 21, 1997

Related U.S. Application Data

[63] Continuation of application No. 08/518,820, Aug. 24, 1995, abandoned.

[51] Int. Cl.⁶ .................................................. G01D 21/00
[52] U.S. Cl. .................... 73/866.5; 73/290 R; 73/304 C; 73/432.1
[58] Field of Search .............................. 73/290 R, 304 R, 73/304 C, 432.1, 866.5; 174/152 GM, 151

[56] References Cited

U.S. PATENT DOCUMENTS

| | | | |
|---|---|---|---|
| 2,624,790 | 1/1953 | White | 73/290 R |
| 2,955,466 | 10/1960 | Coles | 73/304 C |
| 3,119,052 | 1/1964 | Tsuji | 174/152 GM |
| 3,843,832 | 10/1974 | Petersen et al. | 174/151 |
| 4,029,897 | 6/1977 | Mayer et al. | 174/152 GM |
| 4,054,744 | 10/1977 | Beaman | 73/304 C X |
| 4,137,558 | 1/1979 | Beaman | 73/304 C X |
| 4,499,641 | 2/1985 | Fleckenstein | 73/304 C X |
| 4,507,521 | 3/1985 | Goellner | 174/151 |
| 4,594,892 | 6/1986 | Asmundsson | 73/304 C |
| 4,809,129 | 2/1989 | Hansen, III et al. | 73/304 C X |
| 4,902,962 | 2/1990 | Ishikawa | 73/304 R X |
| 5,227,587 | 7/1993 | Paterek | 174/152 GM |
| 5,267,684 | 12/1993 | Catheline et al. | 174/152 GM X |
| 5,272,921 | 12/1993 | Foller et al. | 73/304 R |
| 5,307,678 | 5/1994 | Cost | 73/304 C |
| 5,391,839 | 2/1995 | Lang et al. | 73/304 C X |
| 5,669,263 | 9/1997 | Borchers et al. | 73/866.5 |

FOREIGN PATENT DOCUMENTS

| | | | |
|---|---|---|---|
| 3046-915 | 7/1982 | Germany | 73/304 C |
| 1602-033 | 11/1981 | United Kingdom | 73/304 R |

*Primary Examiner*—George Dombroske
*Assistant Examiner*—Paul D. Amrozowicz
*Attorney, Agent, or Firm*—Wood, Phillips, VanSanten, Clark & Mortimer

[57] ABSTRACT

A secondary seal assembly is used with a process instrument including a probe assembly and an electric housing assembly. The probe assembly includes an adaptor receivable in an opening of a process vessel, a probe extending through the adaptor into the process vessel, and a primary seal between the probe and the adaptor. A probe terminal provides an electrical connection between the probe and the electric housing assembly. The secondary seal comprises an elongate extension housing adapted to be mechanically connected at one end to the adaptor and at another end to the electric housing assembly. A shaft insert is received in the extension housing having a terminal at each of opposite ends, a first terminal for providing an electrical connection to the electric housing assembly and a second terminal for providing an electrical connection to the probe terminal. A seal between the shaft insert and the extension housing provides a secondary seal to the process vessel.

28 Claims, 5 Drawing Sheets

PROBE SECONDARY SEAL

This application is a continuation of application Ser. No. 08/518,820, filed Aug. 24, 1995 now abandoned.

FIELD OF THE INVENTION

This invention relates to process instruments and, more particularly, to a secondary seal for a process instrument including a probe assembly.

BACKGROUND OF THE INVENTION

Various instruments have found use for applications requiring level sensing of, for example, a liquid or bulk material in a vessel. One such instrument comprises a capacitance-type level sensor. With any such instrument it is desirable to ensure safety of both equipment and personnel.

With a capacitance-type level sensor the process instrument includes a probe assembly and an electric housing assembly. The probe assembly includes an adaptor nut receivable in an opening of a vessel and a probe extending through the adaptor nut into the process vessel. The probe exhibits capacitance. Capacitance increases as part of the probe is surrounded by material of dielectric constant greater than one. The capacitance present between the probe and the vessel can be measured to determine level of the material in the vessel.

To measure capacitance between the probe and the vessel the probe must be insulated from the adaptor nut. Also, the vessel interior is typically sealed from outside, particularly in high temperature and/or pressure applications. The sealing and insulation is often provided by a plastic bushing surrounding the probe, where it is held to the adaptor nut.

In the event that a fire occurs, concerns exist that the plastic seal being a "soft seal" might fail. Failure of the seal could cause spewing of flammable material from the process vessel to feed the fire. Advantageously, the process instrument would prevent product from feeding the fire.

The present invention is intended to satisfy one or more of the problems discussed above.

SUMMARY OF THE INVENTION

In accordance with the invention, a process instrument includes a secondary seal assembly.

Broadly, there is disclosed herein a secondary seal assembly for use with a process instrument including a probe assembly and an electric housing assembly. The probe assembly includes an adaptor nut receivable in an opening of a process vessel, a probe extending through the adaptor nut into the process vessel, and a primary seal between the probe and the adaptor nut. A probe terminal provides an electrical connection between the probe and the electric housing assembly. The secondary seal comprises an elongate extension housing adapted to be mechanically connected at one end to the adaptor nut and at another end to the electric housing assembly. A shaft insert is received in the extension housing having a terminal at each of opposite ends, a first terminal for providing an electrical connection to the electric housing assembly and a second terminal for providing an electrical connection to the probe terminal. Means defining a high temperature seal between the shaft insert and the extension housing provides a secondary seal to the process vessel.

In one aspect of the invention the extension housing comprises a two-piece housing. The two-piece housing includes an adaptor bushing secured to an adaptor nut as by welding.

In accordance with another aspect of the invention the shaft insert has a length less than a length of the extension housing.

In one embodiment of the invention the shaft insert is manufactured of stainless steel.

In another embodiment of the invention the shaft insert is manufactured of Inconel.

In accordance with another aspect of the invention each of the first and second terminals comprises a screw threadably received in an end of the shaft insert.

In accordance with yet another aspect of the invention a wire is connected to the second terminal.

In accordance with still a further aspect of the invention, the seal means comprises a glass sleeve formed around a shaft insert. The seal means further comprises a steel sleeve sandwiching the glass sleeve around the shaft insert. The steel sleeve is welded to the extension housing. The steel sleeve extends outwardly from the glass sleeve to define an annular space filled with epoxy. The steel sleeve comprises a stainless steel sleeve.

In accordance with a further aspect of the invention, a tube is slidably received in the one end of the extension housing to protect the wire during installation.

In accordance with a further aspect of the invention, a process instrument includes a probe assembly and an electric housing assembly. The probe assembly includes an adaptor nut receivable in an opening of a process vessel. A probe extends through the adaptor nut and into the process vessel and has a primary seal between the probe and the adaptor nut. A probe terminal provides an electrical connection between the probe and the electric housing assembly. An improvement comprises a secondary seal operatively disposed between the probe assembly and the electric housing assembly. The seal includes an elongate cylindrical extension housing adapted to be mechanically connected at one end to the adaptor nut and at another end to the electric housing assembly. A shaft insert is received in the extension housing having a secondary terminal providing an electrical connection to the electric housing assembly. An electrical conductor is connected at one end of the shaft insert and connectable at an opposite end to the probe terminal. Means defining a high temperature seal between the shaft insert and the extension housing provide a secondary seal to the process vessel.

Further features and advantages of the invention will be readily apparent from the specification and from the drawings.

DETAILED DESCRIPTION OF THE INVENTION

Figures 1, 2:
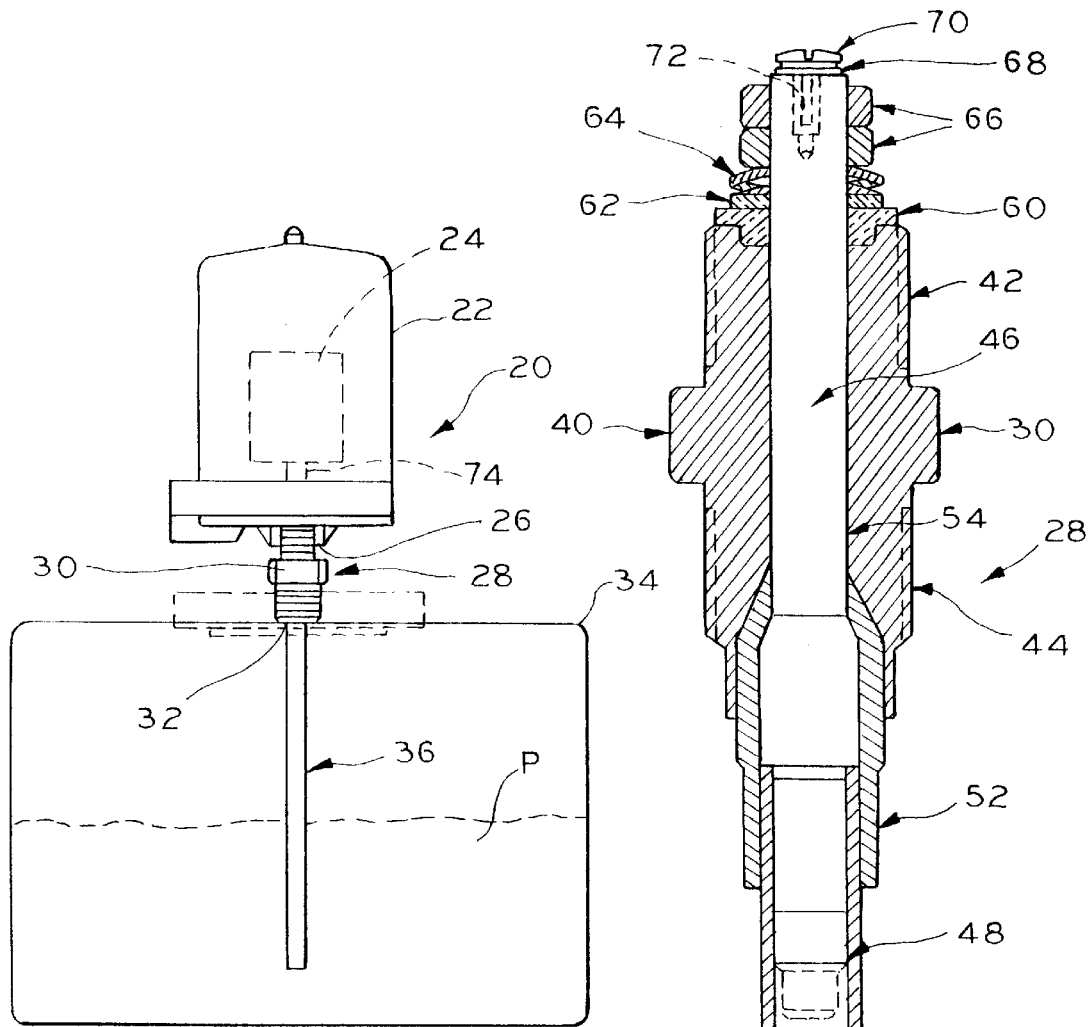
FIG. 1 is a side view of a conventional capacitance level process instrument mounted to a material containing vessel.
FIG. 2 is a sectional view of a conventional capacitance probe assembly.

With reference to FIG. 1, there is illustrated a process instrument 20 comprising a conventional prior art capacitance level sensing instrument. The instrument 20 includes an electric housing assembly 22 housing electrical circuitry 24 of conventional nature. The housing 22 includes a threaded opening 26 for connection to a probe assembly 28. The probe assembly 28 includes an adaptor 30 receivable in the opening 32 of a process vessel 34. A probe 36 extends through the adaptor 30 into the process vessel. The term "adaptor" is used herein to refer to a mechanical connection acting as both an electrical conduit and a process connection.

The process vessel may contain a process material P, the level of which is to be sensed by the instrument 20. The material P acts as a dielectric with the capacitance between the probe 36 and vessel 34 varying as a function of the level of the material P. Particularly, a variable capacitance is formed between two electrodes, one of the electrodes being the probe 36 and the other electrode being the vessel wall 34, assuming it is conductive. If the vessel wall 34 is not conductive, then a suitable reference electrode must be provided, as is conventional.

Referring to FIG. 2, a typical prior art probe assembly 28 is illustrated. The adaptor 30 includes a hex head 40 separating a first ¾" NPT threaded outer wall 42 and a second ¾" NPT threaded outer wall 44. The first threaded outer wall 42 is threadably received in the housing bore 26. The second threaded outer wall 44 is threadably received in the vessel opening 32, as is conventional. A probe shaft assembly 46 extends through the adaptor 30 and is mechanically connected as at 48 to a probe shaft extension 50 having a length corresponding to level in the vessel to be sensed. An insulating seal 52 surrounds the probe shaft assembly 46 internally of the second threaded wall 44 to provide a process seal and to insulate the probe shaft assembly 46 from the adaptor 30. A Mylar tubing 54 surrounds the remainder of the probe shaft assembly 46 as it extends through the adaptor 30, also for insulation. A probe insulator 56 surrounds the probe shaft extension 50 within the vessel. A distal end of the insulator is closed by a probe plug 58. To secure the probe shaft assembly 46 within the adaptor 30, an insulating captivating washer 60 surrounds the probe shaft assembly 46 just above the adaptor first external threaded wall 42 and received thereon are a washer 62, a Bellville disk spring 64 and a pair of jam nuts 66. The probe assembly 28 further includes a terminal 68 in the form of a screw 70 threaded in an opening 72. The terminal 68 is used for connecting an electrical conductor or wire 74, see FIG. 1, extending from the probe assemnbly 28 to the electrical circuit 24, as is well known.

The electrical circuit 24 in the housing 22 may comprise a circuit for determining level or may comprise simple terminations for connection to a remote housing in remote sensing applications, as is well known. In any event, the conductor 74 is connected between the probe terminal 68 and a corresponding terminal (not shown) on the circuit board 24 (or terminal board), as is well known.

The particular form of the housing 22 and probe assembly 28 are intended to be examples of typical such elements. The invention consists of a secondary seal assembly, discussed below, adapted to be used with virtually any probe assembly to be disposed between the probe assembly and an electric housing assembly. The secondary seal assembly is intended to provide a secondary process seal to provide further safety in the event of failure of the primary process seal, i.e., the seal 52 in FIG. 2.

Figure 3:
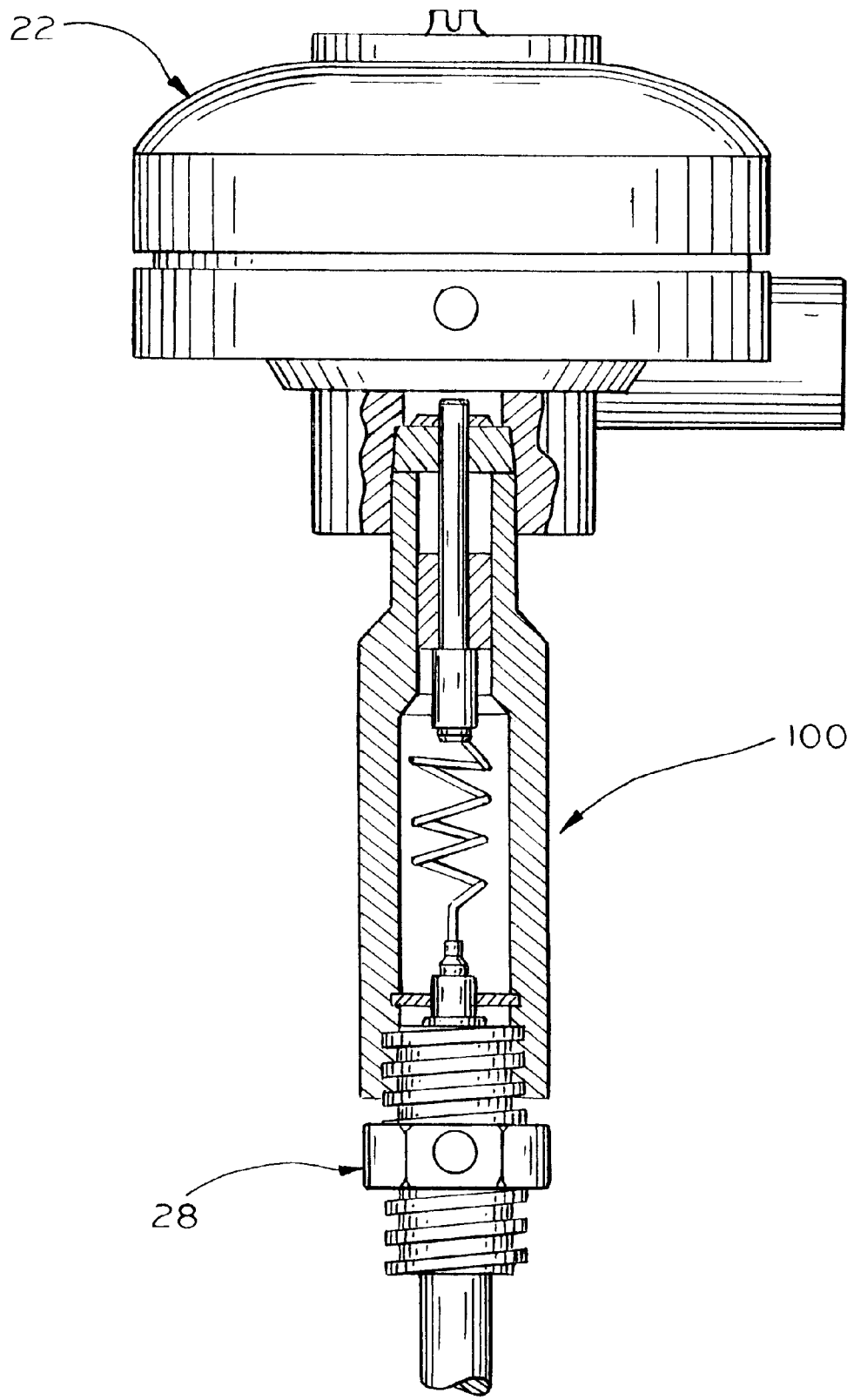
FIG. 3 is a partial sectional view illustrating a secondary seal assembly according to the invention operatively disposed between a probe assembly and an electric housing assembly.
Figure 4:
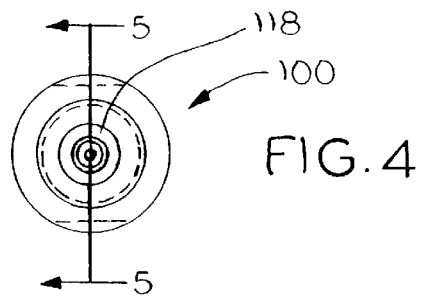
FIG. 4 is an end view of the secondary seal assembly according to the invention.

Referring to FIG. 3, a secondary seal assembly 100 according to the invention is illustrated operatively disposed between a probe assembly 28 and electric housing assembly 22.

Figure 5:
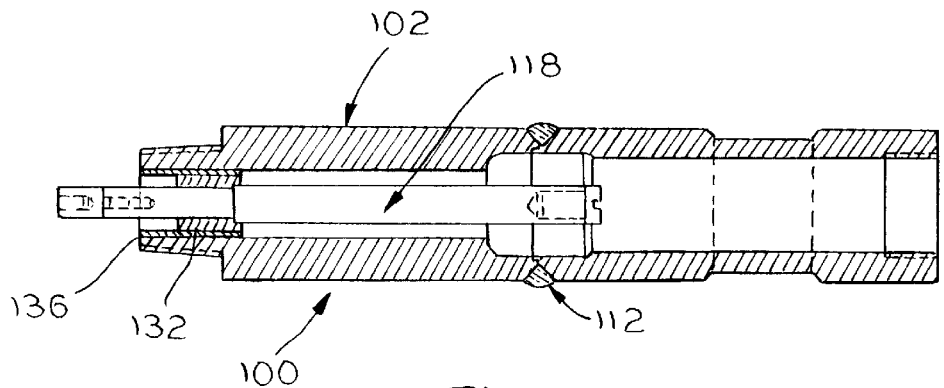
FIG. 5 is a partial sectional view taken generally along the lines 5—5 of FIG. 4.
Figure 6:
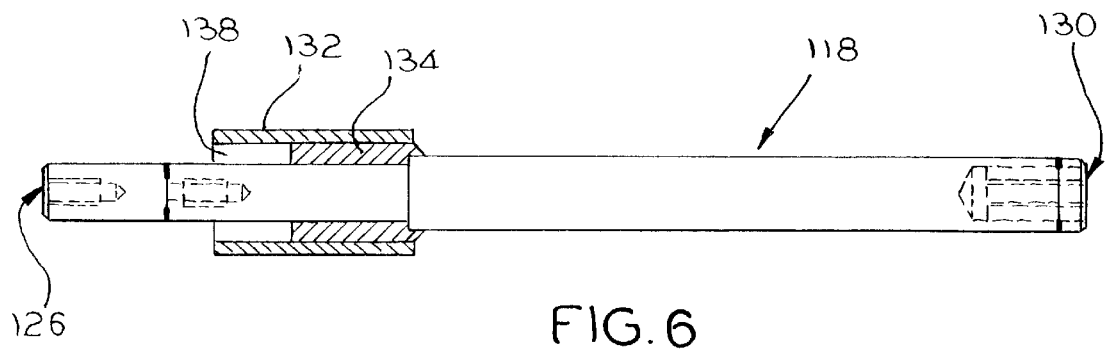
FIG. 6 is a partial sectional view of a shaft insert assembly of the seal assembly of FIG. 5.
Figure 7:
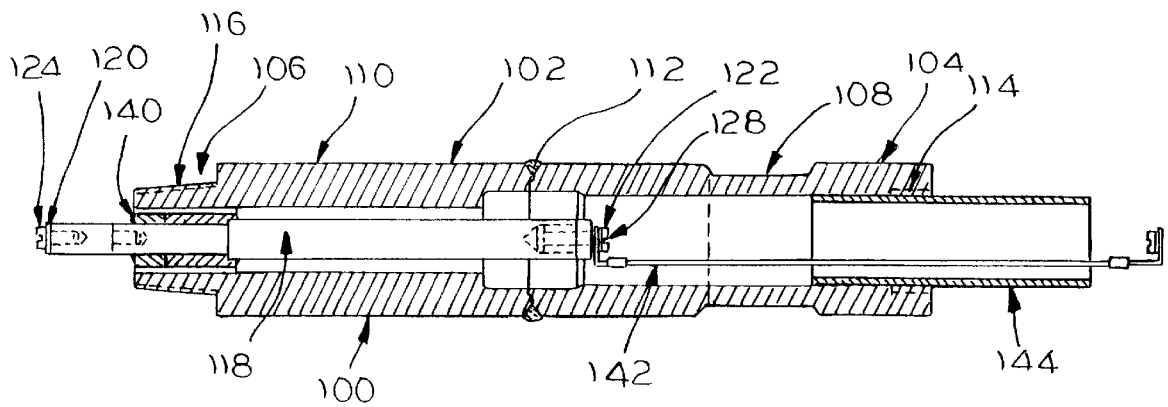
FIG. 7 is a partial sectional view, similar to FIG. 5, showing a complete secondary seal assembly prior to installation.

Referring also to FIGS. 4–7, the secondary seal assembly 100 includes an elongate cylindrical, hollow extension housing 102 adapted to be mechanically connected at a first end 104 to the adaptor 30 and at a second end 106 to the electric housing assembly. Particularly, the extension housing 102 comprises a two-piece housing including an adaptor bushing 108 at the first end 104 and an adaptor nut 110 at the second end 106. The adaptor bushing 108 is secured to the adaptor nut 110 as by welding at 112. The bushing 108 and nut 110 are spot welded as shown in FIG. 5, the spot weld subsequently being sanded smooth, as shown in FIG. 7.

Although the extension housing 102 shown is a two-piece housing, it could be cast or forged as a one-piece housing.

The first end 104 includes a ¾" NPT internal threaded wall 114 for threadably connecting the same to the adaptor first end 42, see FIG. 2. The second end includes a ¾" NPT external threaded wall 116 for threadably connecting the same in the housing opening 26, see FIG. 1.

A shaft insert 118 is received in the extension housing 102. The shaft insert 118 may be formed of T-316 stainless steel, Inconel X-650 or the like, as is desired. The shaft insert 118 has a terminal 120 and 122 at each of opposite ends. The first terminal 120 comprises a screw 124 threadably received in a threaded opening 126, see FIG. 6, for providing an electrical connection to the electric housing assembly. The second terminal 122 includes a screw 128 threadably received in a threaded opening 130, see FIG. 6, for providing an electrical connection to the probe terminal 68, see FIG. 2. The shaft insert 118 has a length less than a corresponding length of the extension housing 102.

A stainless steel sleeve 132 surrounds the shaft insert 118 proximate the end having the first threaded opening 126, see FIG. 6. The stainless steel sleeve 132 is coaxial with the cylindrical shaft insert 118. A glass ceramic sleeve 134 is sandwiched between the shaft insert 118 and the stainless steel sleeve 132. Particularly, the glass ceramic sleeve 134 is melted into place and may comprise Cryoflex PCT 92 and/or Cryoflex 8449. In the illustrated embodiment of the invention, the sleeves 132 and 134 and shaft insert 118 are provided as a sub-assembly which is subsequently inserted in the extension housing 102 with the stainless steel tube 132 welded to the extension housing 102 as at 136.

As particularly illustrated in FIG. 6, the ceramic sleeve 134 has a shorter axial length than the stainless steel 132 to define an annular space 138. The space 138 is filled with a body of epoxy 140, see FIG. 7.

As a complete assembly, a wire 142 is provided connected to the second terminal 122. The wire 142 has a length sufficient so that it extends outwardly of the adaptor go bushing 108, as can be seen in FIG. 7. During installation of the secondary seal assembly 100, concern exists that the wire 142 could be damaged. To prevent such damage, a tube 144 is slidably received in the adaptor bushing 108, as shown in FIG. 7. The tube 144 has a length less than that of the adaptor bushing 108 so that it will not interfere with the mechanical connection between the adaptor bushing 108 and the probe adaptor 30.

Figure 10:
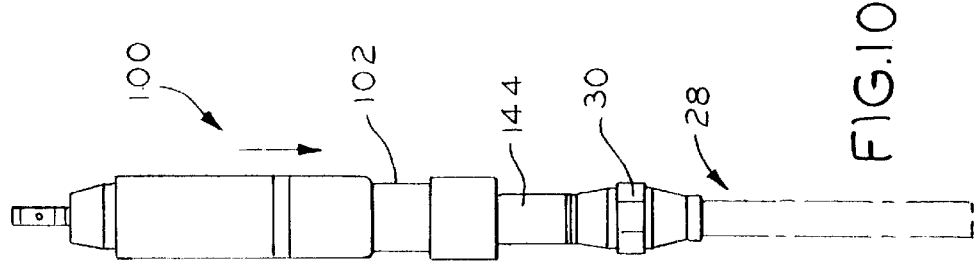
FIGS. 8–10 illustrate in sequence the manner in which the secondary seal assembly according to the invention is mounted to a typical probe assembly.
Figure 9:
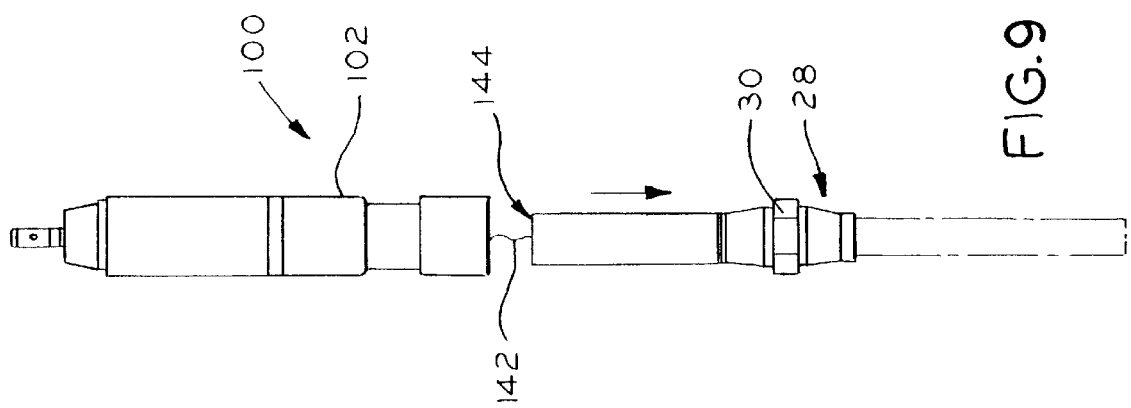
Figure 8:
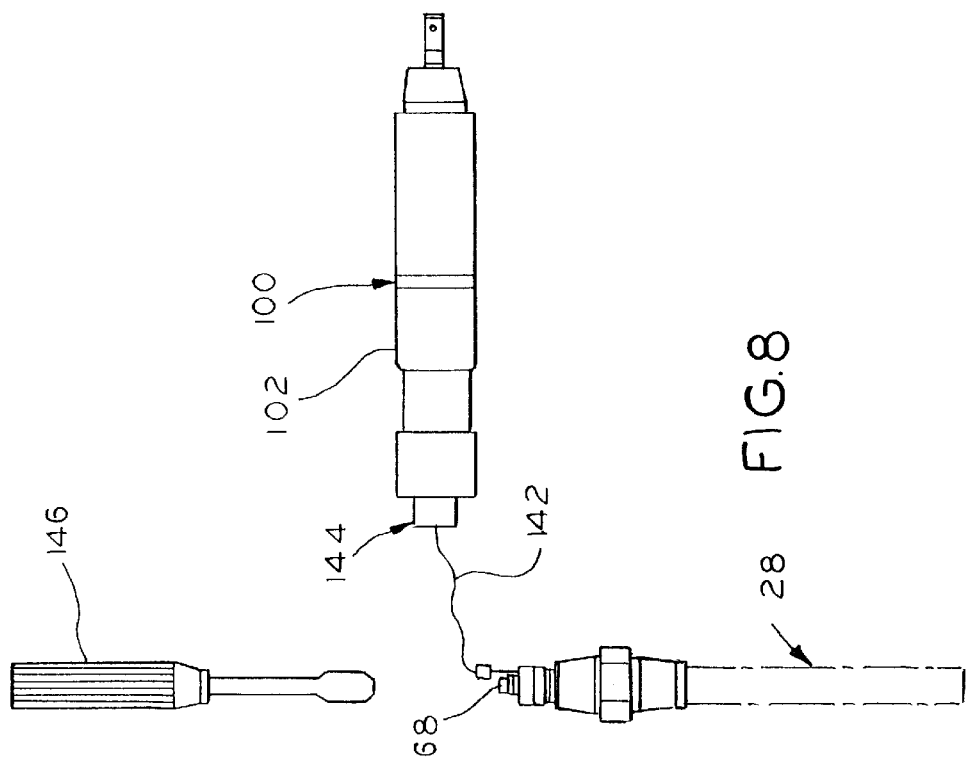

Referring to FIGS. 8–10, the manner in which the secondary steel assembly 100 is mounted to a probe assembly 28 is illustrated.

Referring initially to FIG. 8, the tube 144 is slidably inserted into the extension housing 102 so that the wire 142 is exposed. The wire 142 is then connected to the probe assembly terminal 68 using a screwdriver 146. Referring then to FIG. 9, the tube 144 is removed from the housing 102 and is placed atop the adaptor 30 to protect the wire 142. Referring to FIG. 10, the extension housing 102 is slid down over the tube 144 and screwed onto the probe adaptor 30 in a conventional manner to provide the mechanical connection between the probe assembly 28 and the secondary seal assembly 100.

As can be seen, the tube 144 completely surrounds the wire 142 to protect the same with the extension housing 102 threadably received on the adaptor nut first threaded end 42. The combination of the glass ceramic sleeve 134, stainless steel sleeve 132 and the welding of the stainless steel sleeve 132 to the extension housing 102 as at 136 provides a secondary seal to further prevent flammable process material from escaping in the event of failure of a primary seal within the probe assembly 28, as discussed above. Particularly, in accordance with the invention the secondary seal comprises an explosion proof seal sufficient to satisfy National Electric Code requirements. The secondary seal provides sufficient strength to withstand maximum pressures resulting from an internal explosion to prevent escaping of hot gas. Alternatively, if gas does escape through any path or opening, then the release of the gas is limited to ensure that it is cooled below ignition point before escaping.

Figure 11:
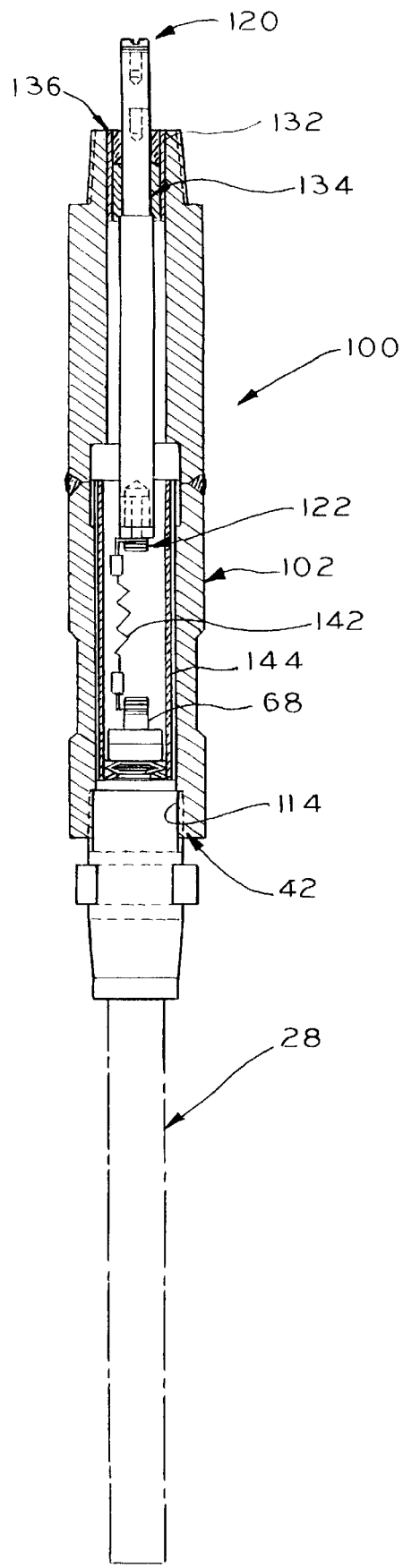
FIG. 11 is a partial sectional view showing the secondary seal assembly according to the invention mounted to a typical probe assembly.

After the secondary seal assembly 100 has been bonded to the probe assembly 28, as illustrated in FIG. 11, then the wire 74 in the electric housing assembly 22 can be connected to the secondary seal assembly first terminal 120, see FIG. 11, to complete the electrical interface between the circuit 24 and the probe assembly 28.

Thus, the use of the secondary seal assembly 100 according to the invention minimizes concerns about a "soft seal" in a probe assembly used in a hazardous process. The secondary seal assembly 100 is designed so that it can be adapted to any capacitance probe assembly from any manufacturer. It can be used as a secondary seal for existing capacitance, RF, RF capacitance, RF impedance and RF admittance process instruments.

I claim:

1. A secondary seal assembly for use with a process instrument and adapted to be disposed between a probe assembly, that is normally mechanically connected to an electric housing assembly, and the housing assembly, the probe assembly including an adaptor receivable in an opening of a process vessel, a probe extending through the adaptor into the process vessel and having a primary seal between the probe and the adaptor, and a probe terminal providing an electrical connection between the probe and the electric housing assembly, the secondary seal assembly comprising:

an elongate extension housing adapted to be mechanically connected at one end to the adaptor and at another end to the electric housing assembly;

a shaft insert received in the extension housing having a terminal at each of opposite ends, a first terminal for providing an electrical connection to the electric housing assembly and a second terminal for providing an electrical connection to the probe terminal; and seal means between the shaft insert and the extension housing for providing a secondary seal to the process vessel.

2. The secondary seal assembly of claim 1 wherein said extension housing comprises a two-piece housing.

3. The secondary seal assembly of claim 2 wherein said extension housing comprises an adaptor bushing secured to an adaptor nut as by welding.

4. The secondary seal assembly of claim 1 wherein said shaft insert has a length less than a length of the extension housing.

5. The secondary seal assembly of claim 1 wherein said shaft insert is manufactured of stainless steel.

6. The secondary seal assembly of claim 1 wherein said shaft insert is manufactured of Inconel.

7. The secondary seal assembly of claim 1 wherein each said first and second terminal comprises a screw threadably received in an end of the shaft insert.

8. The secondary seal assembly of claim 1 further comprising a wire connected to the second terminal.

9. The secondary seal assembly of claim 1 wherein said seal means comprises a glass sleeve formed around the shaft insert.

10. The secondary seal assembly of claim 9 wherein said seal means further comprises a steel sleeve sandwiching the glass sleeve around the shaft insert.

11. The secondary seal assembly of claim 10 wherein said steel sleeve is welded to the extension housing.

12. The secondary seal assembly of claim 10 wherein said steel sleeve extends outwardly from the glass sleeve to define an annular space and said space is filled with epoxy.

13. The secondary seal assembly of claim 10 wherein said steel sleeve comprises a stainless steel sleeve.

14. The secondary seal assembly of claim 8 further comprising a tube slidably received in the one end of the extension housing to protect the wire during installation.

15. In a process instrument including a probe assembly normally mechanically connected to an electric housing assembly, the probe assembly including an adaptor receivable in an opening of a process vessel, a probe extending through the adaptor into the process vessel and having a primary seal between the probe and the adaptor, and a probe terminal providing an electrical connection between the probe and the electric housing assembly, the improvement comprising a secondary seal assembly operatively disposed between the probe assembly and the electric housing assembly including:

- an elongate cylindrical extension housing adapted to be mechanically connected at one end to the adaptor and at another end to the electric housing assembly;
- a shaft insert received in the extension housing having a secondary terminal providing an electrical connection to the electric housing assembly;
- an electrical conductor connected at one end to the shaft insert and connectable at an opposite end to the probe terminal; and
- seal means between the shaft insert and the extension housing for providing a secondary seal to the process vessel.

16. The secondary seal assembly of claim 15 wherein said extension housing comprises a two-piece housing.

17. The secondary seal assembly of claim 16 wherein said extension housing comprises an adaptor bushing secured to an adaptor nut as by welding.

18. The secondary seal assembly of claim 15 wherein said shaft insert has a length less than a length of the extension housing.

19. The secondary seal assembly of claim 15 wherein said shaft insert is manufactured of stainless steel.

20. The secondary seal assembly of claim 15 wherein said shaft insert is manufactured of Inconel.

21. The secondary seal assembly of claim 15 wherein said secondary terminal comprises a screw threadably received in an end of the shaft insert.

22. The secondary seal assembly of claim 15 wherein said electrical conductor comprises a wire connected to the one end of the shaft insert using a screw.

23. The secondary seal assembly of claim 15 wherein said seal means comprises a glass sleeve formed around the shaft insert.

24. The secondary seal assembly of claim 23 wherein said seal means further comprises a steel sleeve sandwiching the glass sleeve around the shaft insert.

25. The secondary seal assembly of claim 24 wherein said steel sleeve is welded to the extension housing.

26. The secondary seal assembly of claim 24 wherein said steel sleeve extends outwardly from the glass sleeve to define an annular space and said space is filled with epoxy.

27. The secondary seal assembly of claim 24 wherein said steel sleeve comprises a stainless steel sleeve.

28. The secondary seal assembly of claim 15 further comprising a tube slidably received in the one end of the extension housing to protect the conductor during installation.

* * * * *